United States Patent [19]

Zair et al.

[11] 3,895,292

[45] July 15, 1975

[54] BRIDGE CIRCUIT FOR MEASURING RESISTANCES

[75] Inventors: Eliezer Zair, Tel Aviv; Arthur J. Greenfield, Bnei Braq, both of Israel

[73] Assignee: Bar-Ilan University, Ramat Gan, Israel

[22] Filed: Apr. 29, 1974

[21] Appl. No.: 464,895

[30] Foreign Application Priority Data
May 4, 1973 Israel.................................... 42203

[52] U.S. Cl. ........... 324/62; 73/362 AR; 324/DIG. 1
[51] Int. Cl. ........................................... G01r 27/02
[58] Field of Search......... 324/62, DIG. 1; 73/27 R, 73/359, 362 AR

[56] References Cited
UNITED STATES PATENTS
3,784,906  1/1974  Ironside ............................. 324/62
3,842,674  10/1974  Wilbur et al. ................. 73/362 AR Primary Examiner—Stanley T. Krawczewicz
Attorney, Agent, or Firm—Donald M. Sandler; Martin P. Hoffman; James H. Ewing

[57] ABSTRACT

A bridge circuit for measuring resistance of a pair of four-terminal resistances having their current terminals serially connected to an ac source comprising: a voltage follower connectable to each voltage terminal of the pair of resistances; a ratio transformer coupled across the output of the first and second of the voltage followers; a first pair of series resistances connected between the outputs of the second and third voltage followers; and a second pair of series resistances connected across the output of the fourth voltage follower; phase matching means across either of the four-terminal resistors and an adjustable tap on the transformer; the centre points of the first and second pairs of series resistances adapted to be connected across a null detector for indicating when the voltage across the input to the third and fourth voltage followers is equal to the voltage between the tap and the output of the second voltage follower.

5 Claims, 2 Drawing Figures

BRIDGE CIRCUIT FOR MEASURING RESISTANCES

This invention relates to a bridge circuit for measuring resistances, and more particularly to a bridge circuit for measuring the resistance of germanium resistance thermometers.

Investigation of low temperature phenomena involves the measurement of temperatures in the range 1°–100°K, and for this purpose it is conventional to use a four-terminal germanium crystal as a temperature sensor since the resistance of germanium in the temperature range of interest, is functionally related to its temperature. Accordingly, the temperature of a crystal is determined by measuring its resistance with a sensitive bridge circuit, and converting the resistance to temperature using a calibration curve furnished by the crystal manufacturer. The conventional ac Kelvin double bridge, wherein a null establishes when a standard resistance is equal to the unknown resistance of the crystal, is not suitable for use with germanium resistance thermometers because the lead resistances are often as large as the resistance of the germanium itself (typically 10 ohms to 100,000 ohms between liquid nitrogen and liquid helium temperature). To circumvent this difficulty, voltage followers have been introduced into the bridge arms for the purpose of providing a very high impedance to the flow of ac currents. A bridge of this nature is described in *Review of Scientific Instruments*, Vol. 41, page 1109). In the operation of this bridge, a decade box provides a selectable standard resistance and a nullbalance is obtained when the selected standard resistance is equal to the resistance of the germanium crystal.

The problem with this conventional approach is the large number of precision resistances that must be switched into the circuit. In order to measure the resistance of the germanium crystal to an accuracy of only 0.01 percent as the resistance varies between 10 ohms and 100,000 ohms, an eight decade resistance box with a range from 100 kilo-ohms down to 1 milliohm and with resistors having an accuracy of 0.01 percent is required. Such a decade box, involving as it does eight decades with eight switches involving 80 resistors each, results in an expensive piece of equipment that is bulky in size. Furthermore, when the problem is to measure a temperature gradient involving a pair of germanium resistors, two sets of bridges are required for simultaneous measurement thus adding to the complexity of the instrumentation.

A further problem worthy of mention concerns the power limitation of germanium resistors if Joule self-heating is to be avoided. At power consumptions greater than about $10^{-8}$ to $10^{-7}$ watts, the self-heating of the germanium heats it above the temperature of the sample. Therefore, for accurate measurements of the temperature it is essential to keep the current through the germanium to a value that avoids self-heating. For a 10 ohm resistance, the current should not exceed 0.1 mA which provides a maximum voltage drop of only 1 mV. If it is desired to measure voltage with an accuracy of 0.01 percent, then the noise becomes an important factor.

It is therefore an object of the present invention to provide a new and improved ac bridge which eliminates the need for many decades of resistance, and which permits the ratio of two resistances to be measured directly even at current levels exceeding the limits imposed by self-heating without the usual consequent inaccuracy.

According to the present invention there is provided a bridge circuit for measuring the resistance of a pair of four-terminal resistances having their current terminals serially connected to an ac source comprising: a voltage follower connectable to each voltage terminal of the pair of resistances; a ratio transformer coupled across the output of the first and second of the voltage followers; a first pair of series resistances connected between the outputs of the second and third voltage followers; and a second pair of series resistances connected across the output of the fourth voltage follower; phase matching means across either of the four-terminal resistors and, an adjustable tap on the transformer; the centre points of the first and second pairs of series resistances adapted to be connected across a null detector for indicating when the voltage across the input of the third and fourth voltage followers is equal to the voltage between the tap and the output of the second voltage follower.

When a null condition is established by a proper adjustment of the tap on the transformer, and the trimming capacitor (i.e., when the voltage across the input to the third and fourth voltage follower is equal to the voltage between the tap and the output of the second voltage follower), the tap setting of the transformer defines the ratio of the resistance connected across the inputs to the third and fourth voltage followers to the resistance connected across the first and second voltage followers. The first important consequence flowing from this situation arises when one of the pair of four terminal resistors has a preselected and known value exceeding the resistance of the other four terminal resistors which in this case would be the germanium resistance thermometer. In such case, the value of the unknown germanium resistance thermometer would be determined by the product of the value of the known resistance by the setting of the transformer tap.

Thus, a single known resistance of great precision can be used, with various values of the unknown resistance being ascertained by a simple adjustment of the transformer tap. Since transformers of great precision are commercially available, the present invention permits a less complicated and less expensive bridge to be built while at the same time providing greater accuracy.

The second important consequence flowing from the present invention arises when each of the two four-terminal resistors is a germanium resistance thermometer. In such case, a direct measurement of small temperature gradients is possible inasmuch as the setting of the tap on the transformer provides the ratio of the two resistances directly. In the event that the germanium resistance thermometers are selected such that, in a given temperature range, each calibration curve has the same slope, the ratio of the resistances of the thermometers will be a constant within this range, so that from this ratio it is possible to determine the temperature difference between the thermometers regardless of the absolute value of the temperature. This arrangement permits measurement of low temperature transport properties such as thermal conductivity and thermoelectric power wherein very small temperature gradients of the order of magnitude of $10^{-3}$ degrees must be determined with a 1 percent accuracy. Corresponding accuracy when absolute temperatures are measured must approximate 0.0001 percent so that the present invention provides a significant improvement in measurement techniques.

Another advantage of the present invention in measuring temperature gradients lies in the simultaneous nature of the measurements making it possible to measure a small but constant temperature gradient superimposed on drifts of the average temperature of the sample. Furthermore, the arrangement of the present invention permits an increase in sensitivity to be achieved at a somewhat reduced accuracy of temperature measurement. For example, the use of germanium resistance thermometers whose temperature gradients are matched permits the power level to be increased considerably above the usual level permitted by the Joule self-heating phenomenon. Thus, while the germanium resistance thermometers will be heated due to greater-than-normal permitted current flow, each will be heated in the same manner cancelling the self-heating effect insofar as the accuracy with which the ratio of the resistances is measured.

An embodiment of the invention is illustrated by way of example in the accompanying drawings wherein.

Figure 1:
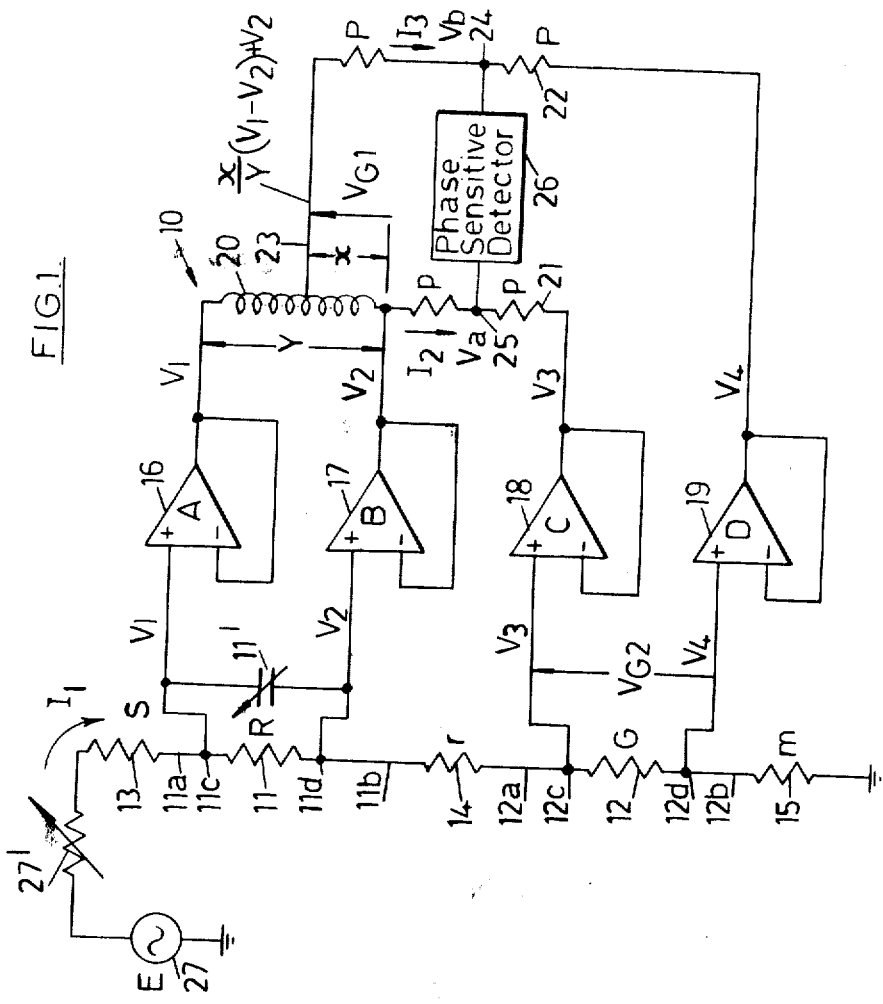
FIG. 1 is a schematic block diagram illustrating the bridge circuit according to the present invention.

Referring now to FIG. 1 of the drawings, reference 10 designates a bridge circuit for measuring resistance according to the present invention. Bridge circuit 10 comprises a pair of four-terminal resistances 11 and 12 of values R and G respectively, four voltage followers 16–19, ratio transformer 20, a first and a second pair of series resistors 21 and 22, and a null detector 26. Either or both of resistances 11 and 12 may be germanium resistance thermometers in the form of a chip of germanium provided with one pair of terminals that serve as the current connections and another pair of terminals across which the effective resistance is presented. Thus, the current terminals of resistance 11 are 11a and 11b while the current terminals of resistance 12 are terminals 12a and 12b. The resistances 13, 14 and 15 represent the various lead resistances involved in connecting the resistances 11 and 12 in series with an ac source 27.

A separate voltage follower is connected to each voltage terminal of the pair of resistances 11 and 12. Thus, the input to voltage follower 16 is connected to terminal 11c of resistance 11 while the input to voltage follower 17 is connected to terminal 11d. Thus, resistance 11 is connected between the inputs to the first and second voltage followers 16 and 17. Similarly, the input to voltage follower 18 is connected to terminal 12c of resistance 12 while the input to voltage follower 19 is connected to terminal 12d of this resistance. Thus, resistance 12 is connected between the inputs to the third and fourth voltage followers 18 and 19.

As is well known, a voltage follower is an operational amplifier provided with negative feedback such that the output voltage is essentially the same as the input voltage. As a consequence, each voltage amplifier provides a very high input impedance and a very low output impedance. Consequently, almost no current flows in the input and output leads of the voltage followers, and the right-hand portion of the circuit shown in FIG. 1 comprising transformer 20 and the two pairs of series resistances 21 and 22, is effectively isolated from the left-hand portion of the circuit comprising the resistances 11–15.

Transformer 20 is connected across the output of the first and second of the voltage followers 16 and 17. Thus, the voltage across the transformer 20, $V_1-V_2$, is the same as the voltage across the resistance 11 as measured between the voltage terminals 11c and 11d.

The first pair of series resistances 21 comprises two equal valued resistors $p$ connected in series at node 25. This pair of series resistances is connected between the outputs of the second and third voltage followers 17 and 18. Thus, the voltage across pair 21, $V_2-V_3$, is the same as the voltage between the voltage terminals 11d and 12c of resistances 11 and 12, and is due to lead resistance 14 of value $r$.

The second pair of series resistances 22 comprises two equal valued resistors P connected in series at node 24. This second pair of series resistances is connected across the output of the fourth voltage follower 19 and an adjustable tap 23 on the transformer. The voltage appearing across the tap, referred to the output of voltage follower 17, is thus a fraction of the voltage appearing across the transformer 20. Designating this fraction as $x/Y$, the voltage across the tap of the transformer is:

(1) $\quad V_{G1} = (x/Y)(V1-V2)$

A phase sensitive detector 26 is connected between nodes 24 and 25 for the purpose of detecting a null condition which occurs when the voltage at these nodes is equal in magnitude and phase. That is to say, the voltage $V_a = V_b$ when the null condition exists.

Finally, a trimming capacitor 11' is connected across the resistor 11 so as to allow for phase matching by separately balancing the in-phase and out-of-phase components in the conventional manner. For this purpose the trimming capacitor could equally well have been connected across the resistor 11.

From a circuit analysis of FIG. 1, it can be shown that the voltages and nodes 24 and 25 have the following values:

(2) $\quad V_a = V_3 + 1_2 p$ (2a) $\quad = E(m+G+r/2)/(s+r+R+G+m)$ (3) $\quad V_b = V_4 + I_3 p$ (3a) $\quad = E(m + (R/2)(x/Y) + G/2 + r/2)/(s+r+R+G+m)$ When a null condition exists, equation (2a) and equation (3a) are equal. In such case, the resistance G is related to the resistance R as follows:

(4) $\quad G = (x/Y) R$

Furthermore, it can be seen from inspection that, when a null condition exists, $V_{G1} = V_{G0}$. Summarizing, when a null condition exists, the value of the resistance 12 across the inputs of the third and fourth voltage followers 18 and 19 is equal to the product of the setting of the tap on the transformer 20, namely the fraction $x/Y$, by the value of the resistance 11 between the inputs of the first and second voltage followers 16 and 17. It follows therefore, that given the value of either of resistances 11 or 12, the other resistance can be found by adjusting the tap 23 on the transformer 20 until a null condition occurs to determine the followers.

Two modes of operation are possible. In the first mode, one or the other of resistances 11 and 12 is a germanium resistance thermometer located in a sample whose temperature is to be measured, while the other is a fixed precision resistance. The larger of the two resistances is placed between voltage followers 16 and 17. By activating signal source 27, a current $I_1$ will flow through the resistances 11-15, the resistance 15 of value $m$ representing a meter for indicating the level of current flow which can be controlled by adjustable potentiometer 27 to limit the current to a level that will not exceed the Joule self-heating limit of the crystal. As a result, current $I_2$ flows through node 25 and current $I_3$ flows through node 24. Tap 23 may then be manually adjusted until detector 26 senses a null condition (i.e., $Va = Vb$). The setting of tap 23 specifies the fraction $x/X$; and the resistance of the crystal can be calculated from equation (4) using the value of the known resistance. By making reference to the calibration curve associated with the crystal, the temperature of the sample can be ascertained.

In the second mode of operation, both resistances 11 and 12 are germanium resistance thermometers located at different points on a sample for the purpose of determining the temperature gradient between the two points. As indicated above, the crystals must be matched so that the difference between the slopes of their respective calibration curves are negligible. When the source 27 is activated the current $I_1$ can exceed the level causing Joule self-heating since both crystals will be heated to the same extent by the current, and any difference in resistance will thus be due entirely to the difference in temperature between the two points of the sample. Tap 23 can now be adjusted to achieve a null condition, the setting of the tap providing the ratio of the two resistances. Such ratio yields the temperature difference directly from either calibration curve associated with the crystals. In the second mode of operation, it is again essential for the larger of the two resistances to be placed between voltage followers 16 and 17.

In view of the necessity for the value of the resistance between voltage followers 16 and 17 to exceed the value of resistance between voltage followers 18 and 19, greater versatility and improved performance can be achieved by interposing a selector switch arrangement between the terminals $11c$, $11d$, $12c$ and $12d$ on the one hand, and the inputs to the four voltage followers 16-19 on the other hand. Such arrangement is shown schematically in FIG. 2 to which reference is now made.

Figure 2:
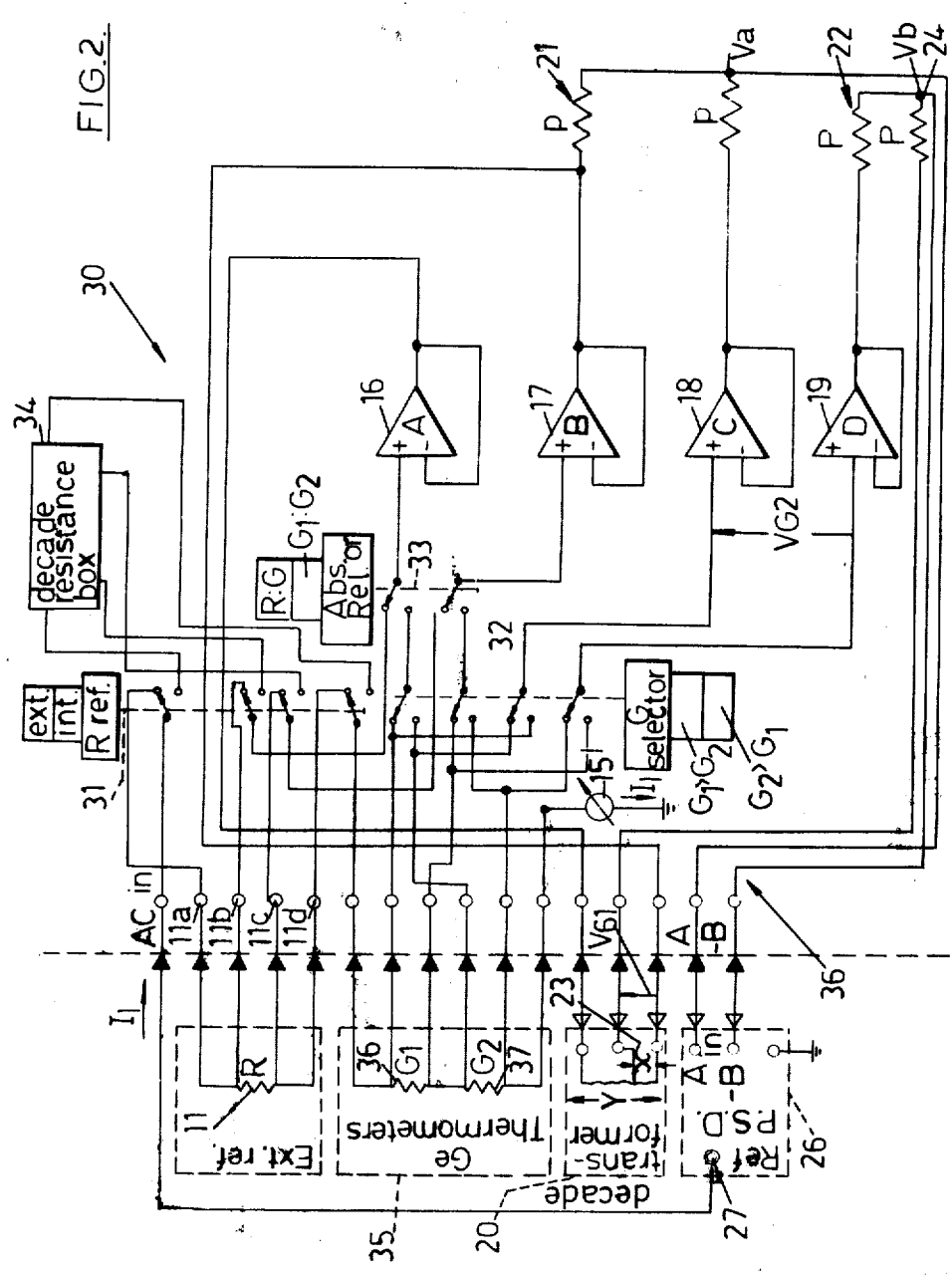
FIG. 2 is a circuit diagram of a switching arrangement by which the versatility of the bridge circuit of the present invention is practicably applied.

In the improved version of the bridge circuit designated by reference numeral 30 in FIG. 2, the bridge includes, in addition to the four voltage followers 16-19, the two pairs of resistances 21 and 22, the transformer 20, the hull detector 26 and an external reference resistance 11. Three selector switches 31, 32, and 33, an internal decade resistance box 34, meter 15' and germanium resistance thermometers 35. In the preferred arrangement, the resistance 11, the thermometers 35, the transformer 20 and the phase sensitive detector 26 including the voltage source 27 are in separate modules that are plugged into a connector 36 provided in a chassis housing the remainder of the components of the bridge.

Switch 31 selects whether external resistance 11, or an internal resistance from decade resistance box 34, is a part of the input circuit of the bridge. In its up position, switch 31 will cause the input current $I_1$ to flow through resistance 11; while, when the switch 31 is in its down position, the input current $I_1$ will instead flow through a resistance selected from the decade resistance box 34.

Switch 32 selects one of the two germanium thermometers 36 or 37 for connection across the first and second voltage followers 16 and 17. When the switch arm is in the up position shown in FIG. 2, thermometer 37 is connected across voltage follower 16 and 17; while, when the arm is in its down position, thermometer 36 is connected across these voltage followers.

Finally, switch 33 determines whether one of the known resistances (either resistance 11 or a resistance from decade resistance box 34) is compared to a germanium thermometer (for absolute temperature measurements) or whether the germanium thermometers are compared with themselves (for temperature gradient measurements). When the switch arm is in the up position shown in FIG. 2, the fixed known resistance (internal or external) is compared with one of the germanium thermometers (depending upon the state of switch 32); while when the switch is in its down position, the two germanium resistors are compared to each other.

For example, if it is desired to ascertain the temperature of a sample with which thermometer 37 is associated and it is known that the external resistance 11 exceeds the resistance of thermometer 37, the switches 31, 32, 33 would have the states shown in FIG. 2. In such case, thermometer 37 is connected across voltage followers 16 and 17 while resistance 11 is connected across voltage followers 18 and 19. By adjusting the tap 23 of the decade transformer 20, the fraction $x/Y$ can be measured from which the resistance of thermometer 37 can be calculated from equation (4).

In the event, however, that the value of the resistance 11 is less than the resistance of thermometer 37, a suitable resistance may be selected from the standard resistor box 34 and this resistance substituted for the resistance 11 by operating switch 31 so that the movable arm is in its down position. In this case, the resistance of thermometer 37 is ascertained from the setting of tap 23 and the value of the resistance selected by the resistance box 34.

In the event that a temperature gradient is to be measured using the thermometers 36 and 37, the state of switch 31 is immaterial. However, the movable arm of switch 33 should be in its down position and the movable arm of switch 32 should be in its up position when the resistance of thermometer 36 exceeds the resistance of thermometer 37. If the reverse situation occurs, the movable arm of switch 32 should be moved in its down position in order for the bridge to operate properly.

The module representing the external resistance 11 is a plug-in module, so that various modules could be used in place of or in conjunction with the standard resistor resistance box 34. However, it is convenient to provide the instrument with a resistance box to facilitate making measurements.

In an actual instrument, the decade transformer 20 was a Model 1493 transformer made and sold by General Ratio Co., while the phase-sensitive detector 26 and power source 27 were provided by a Model 124 device produced by Princeton Applied Research. The meter 15' preferably is one having a 100 microampere movement provided with three ranges of full scale deflection; 1 micro-ampere, 10 micro-amperes and 100 micro-amperes. The decade resistance box 34 may be provided with 12 resistances varying from 10 ohms to 50 Kohms. With this arrangement, it is possible to measure temperatures in the range of liquid nitrogen to liquid helium using germanium thermometers with an accuracy of better than 0.001 percent in a frequency range of 30 to 100 Hz. The particular transformer and phase-sensitive detector are only illustrative of typical devices that can be utilized.

We claim:

1. A bridge circuit for measuring resistance of a pair of four-terminal resistances having their current terminals serially connected to an ac source comprising: a voltage follower connectable to each voltage terminal of the pair of resistances; a ratio transformer coupled across the output of the first and second of the voltage followers; a first pair of series resistances connected between the outputs of the second and third voltage followers; and a second pair of series resistances connected across the output of the fourth voltage follower; phase matching means across either of the four-terminal resistors and an adjustable tap on the transformer; the centre points of the first and second pairs of series resistances adapted to be connected across a null detector for indicating when the voltage across the input to the third and fourth voltage followers is equal to the voltage between the tap and the output of the second voltage follower.

2. A bridge circuit according to claim 1 including a switch arrangement for selectively changing the order of the connection of the inputs of the four voltage followers to the voltage terminals of the pair of four terminal resistances.

3. A bridge circuit according to claim 1 wherein one of the four terminal resistances is a known resistance greater than the other.

4. A bridge circuit according to claim 3 wherein the known resistance is one of a group of resistances, and a selector switch is provided by which one of the group is selected.

5. A bridge circuit according to claim 1 wherein both of the four terminal resistances are unknown and the measurement is to yield the ratio of their resistances.

* * * * *